United States Patent [19]
Buscher et al.

[11] 3,853,504
[45] Dec. 10, 1974

[54] APPARATUS FOR CONTINUOUSLY PRECIPITATING LIQUID METALS FROM GASES

[75] Inventors: Enno Buscher, Bergisch-Gladbach; Friedrich Eils, Bremen; Walter Jansing, Bensberg-Moitzfeld; George Kirchner, Bensberg-Frankenforst; Dieter Markfort, Forsbach, all of Germany

[73] Assignee: Interatom Internationale Atomreaktorbau GmbH, Bensberg/Koln, Germany

[22] Filed: July 22, 1971

[21] Appl. No.: 165,002

[30] Foreign Application Priority Data
July 23, 1970 Germany............................ 2036568
Mar. 17, 1971 Germany............................ 2112891

[52] U.S. Cl............................. 55/80, 55/98, 55/267, 55/324, 55/325, 55/484, 55/485, 55/487, 55/515, 55/523, 55/525, 176/37
[51] Int. Cl............................................. B01d 51/00
[58] Field of Search.............. 55/324, 18, 20, 80, 97, 55/98, 267, 268, 269, 315, 318, 319, 320, 321, 322, 323, 325, 326, 327, 329, 332, 478, 482, 484, 485, 486, 487, 488, 489, 490, 512, 515, 516, 518, 519, 523, 525, 526; 176/37, 92 R, 92 B; 137/312; 75/63

[56] References Cited
UNITED STATES PATENTS

| | | | |
|---|---|---|---|
| 3,093,564 | 6/1963 | Weisman et al. | 204/193.2 |
| 3,136,627 | 6/1964 | Caldwell, Jr. et al. | 75/63 |
| 3,278,386 | 10/1966 | French et al. | 176/37 |
| 3,291,205 | 12/1966 | Harris et al. | 165/94 |
| 3,396,515 | 8/1968 | Wright | 55/269 |
| 3,557,536 | 1/1971 | Ririe | 55/504 X |

OTHER PUBLICATIONS

"Nuclear Merchant Ship Reactor Final Safeguards Report, Environmental Analysis of NS 'Savannah' Operation at Camden," U.S. A.E.C. Report ORNL–2867 (Rev.) Oak Ridge National Laboratory, Jan. 24, 1961, pages 9–11.

*Primary Examiner*—Dennis E. Talbert, Jr.
*Attorney, Agent, or Firm*—Herbert L. Lerner

[57] ABSTRACT

Method for continuously precipitating liquid metals from gases, and especially precipitating sodium from protective gas of sodium cooled nuclear power plants in which the sodium is present in finely distributed and dissolved form includes the steps of heating the gas bearing the liquid metal to a temperature above the saturation temperature thereof, and then cooling the gas bearing the liquid metal to a temperature still exceeding the solidification temperature of the liquid metal; and apparatus for carrying out the method.

12 Claims, 6 Drawing Figures

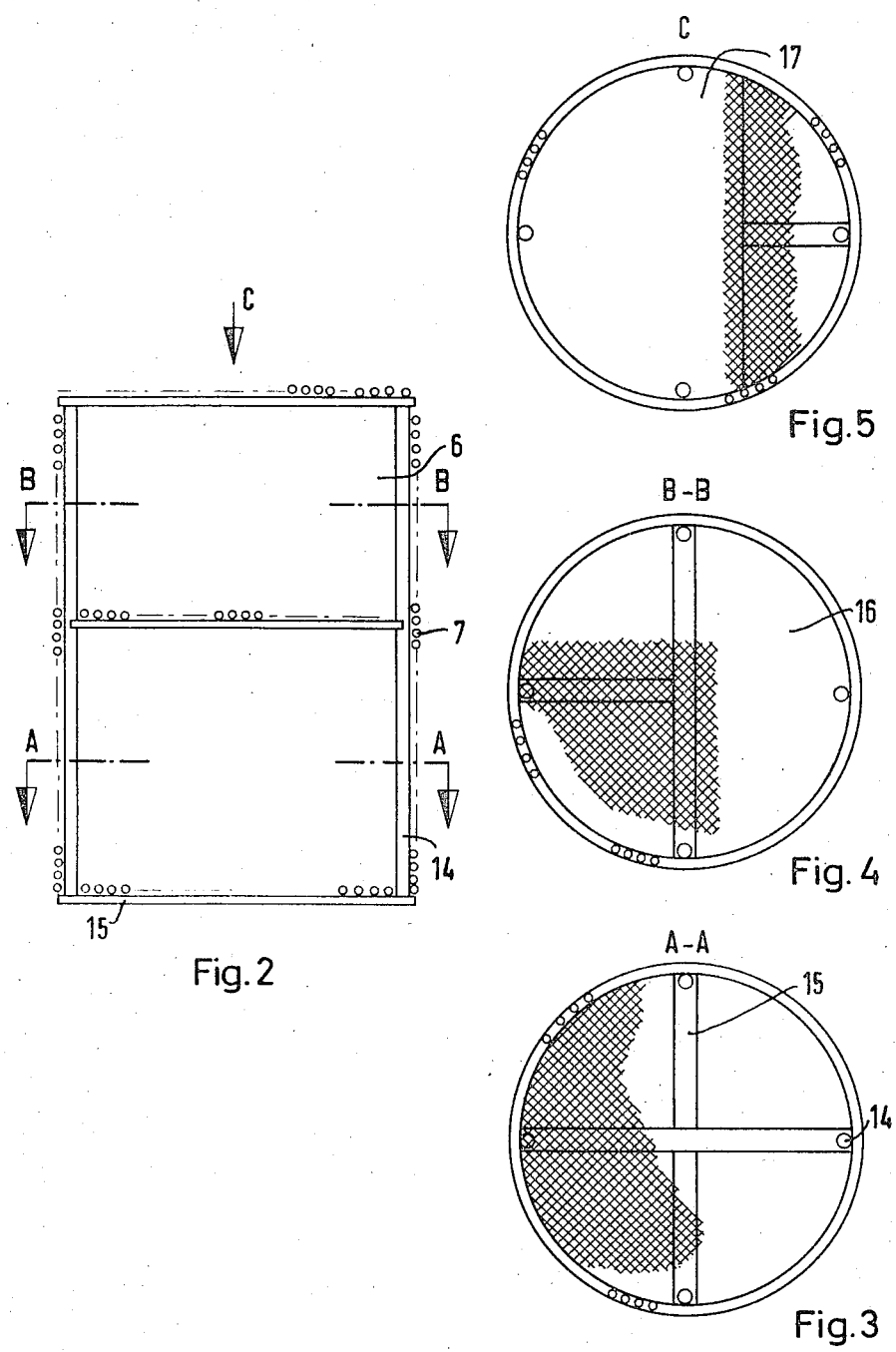

APPARATUS FOR CONTINUOUSLY PRECIPITATING LIQUID METALS FROM GASES

The invention relates to method and apparatus for continuous separation or precipitation of liquid metals from gases, and more particularly to method and apparatus for precipitation of finely distributed and dissolved sodium from the protective gas of sodium-cooled nuclear power plants.

Some metals, such as sodium, for example, with low melting and high boiling points, generally referred to as liquid metals, have great advantages with respect to heat transfer, on the one hand, but on the other hand, require that special measures be taken with respect thereto, as to their purity and the exclusion of air therefrom, because they often react violently with air or moisture or at least form undesirable and hard-to-remove deposits when exposed thereto. For this reason all spaces above the liquid metal surface are filled with an inert or a protective gas, such as argon, for example. A portion of the liquid metal evaporates at the surface of the hot liquid metal and, due to natural convection alone, travels in gaseous form dissolved in or diffused through the protective gas, to cooler parts of the system, where it condenses and a portion thereof is precipitated in solid or liquid form on cold surfaces and the rest remains suspended as an aerosol in the protective gas. Even when the protective gas is again heated over free liquid metal surfaces, part of this aerosol mist remains, since the protective gas absorbs additionally evaporated liquid metal. Small traces of oxygen and moisture, which penetrate into the protective gas through everpresent leaks, react with the liquid metal in the protective gas and form extremely fine particles which remain suspended in the protective gas. It has been observed in sodium-cooled nuclear power reactors that, because of the processes described above, the protective gas located above a very large, hot liquid metal surface contains up to 10 times the quantity of liquid metal that would be expected to be continued therein in accordance with the gas laws. The aerosols precipitate especially on cooler parts of the system and frequently form troublesome deposits which cannot be removed by heating alone because they are not formed only of metal.

Methods of precipitating solid and liquid substances from gases are well known. Detailed information concerning such methods may be found, for example, in "Fortschritte der Verfahrenstechnik," Verlay Chemie, Weinheim, Vol. 7, pp. 895 and 896, and also in Vol. 8, p. 904. However, no special references are made therein with respect to the precipitation of metal vapors from gases. In a report, dated April 9, 1970, by R. A. Müller of the Institute for Reactor Development at the Nuclear Research Center in Karlsruhe, Germany, on the "Specialists Meeting on Sodium Vapor Control," in Cadarache, France, March 19 and 20, 1970, the problems of precipitation of sodium from protective gases are emphasized. On page 4 of this report, it is stated: "For the precipitation of sodium aerosols, two cold mechanical filters are used which are selectively able to be changed over and alternatingly operable. The service life of a filter is at most several days, but often only one day." On page 6 of this report, the author states: "The effectiveness of different types of sodium mist separators or precipitators and the service life of the mechanical filters (sintered filter cartridges of stainless steel) located downstream thereof is presently being studied in a special installation. The relatively short service life of these afterconnected filters is a cause for worry, etc." Also on page 6:"...washing towers filled with Raschig rings and in which sodium trickles down opposite in direction to the rising argon stream, similar to the method known from general process technology. These preliminary separators are also followed here by fine mechanical filters operating at ambient temperature."

An object of the invention is the continuous separation or precipitation of liquid metals from gases. More specifically, an object of the present invention is to increase the efficiency of precipitation over that of the heretofore known apparatus of this general type and to keep the space requirements of the apparatus at a minimum.

With the foregoing and other objects in view, there is provided in accordance with the invention, method of continuously precipitating liquid metal from gas in which the liquid metal is finely distributed which comprises the steps of heating the gas bearing the liquid metal to a temperature above the saturation temperature thereof, and then cooling the gas bearing the liquid metal to a temperature still exceeding the solidification temperature of the liquid metal.

The theory regarding the precipitation of fine droplets of liquid from gases was based heretofore on the idea that the fine droplets of liquid muat first coagulate, so that they could then be precipitated under the influence of certain forces thereon. This theory is correct for economical precipitation of large quantities of liquid with little expenditure of energy. In the invention of the instant application, however, emphasis has been placed more on providing the most extensive precipitation of small and varying quantities possible over long periods of operation. The invention is based on the cognizance that in this case it is more logical to vaporize the fine drops of liquid first, because the vaporized metal travels under the influence of the vapor pressure in direction of the concentration gradient toward the cool surfaces and is condensed there, whereas with respect to the liquid particles the surface tension thereof increases with decreasing particle diameter and the influence or effect of the mass forces of the particles upon the precipitation process becomes smaller with the decrease in the particle diameter.

In order to provide the shortest possible path for the vapor to cold surfaces, the precipitation is carred out according to another feature of the invention, in a filter of high thermal conductivity and small pore size.

In order to protect against the danger of clogging, the precipitation is effected according to a further feature of the invention, in a filter having pores whose sizes decrease in direction of flow. When the precipitation process is carried out in relatively small apparatus, however, the feature of decreasing pore sizes may be dispensed with or, for example, the pores may be of only two different sizes.

Further in accordance with another feature of the invention, the gas is cooled by mixing it with cold gas, for instance, by mixing it with fresh gas that is fed into the system.

The invention also relates to apparatus for carrying out the method of the invention comprising an elongated substantially vertical container structure traversible from bottom to top thereof by a fluid flow, means located in substantially the lower half of the container structure for heating the fluid flowing therethrough; metallic packing material located in the lowermost third of the container structure, a supply of steel wool located in the middle third of the container strucure, and at least one substantially vertical, elongated sintered-metal filter located in the uppermost third of the container structure, the filter having a closed lower end and an open upper end, the upper end being secured in a sealed bulkhead. When the container structure is provided with a diameter of 80 mm and a length of 200 mm, the apparatus of the invention has a continuous rating of 1 Nm$^3$/hr and can be operated at 5 Nm$^3$/hr for short periods with satisfactory precipitation.

For larger throughput rates, there is further provided, in accordance with another embodiment of the apparatus of the invention, a vessel, a plurality of disc filters mounted in the vessel and formed of porous sintered metal, the disc filters being tightly connected to one another, alternatingly at respective outer and inner peripheries thereof so as to form an inner chamber defined by the tightly connected disc filter and an outer chamber defined by the disc filters and the wall of the vessel, means connected to the outer chamber for supplying gas bearing liquid metal to the outer chamber, and outlet means connected to the inner chamber for discharging therefrom gas filtered through the disc filters into the inner chamber from the outer chamber.

With the foregoing embodiments of the invention, it is possible to achieve a precipitation efficiency of 99.999 percent. It is important for the operation of the precipitation apparatus according to the invention that the temperature of the sintered metal be only slightly above the solidification temperature of the liquid metal to be precipitated. At this temperature, the partial pressure of the liquid metal is so low that virtually no liquid metal is present any longer in gaseous state. On the other hand, the surface tension of the liquid metal is so high at this temperature that the liquid metal droplets reaching the sintered metal combine to form large drops and run downwardly under the effect of gravity. For this reason, it is advisable to dispose the disc filters so that the liquid metal cannot travel from one filter disc to another, for example, by disposing the disc filters so that their axis is horizontal.

According to a further feature of the invention, cooling and/or heating means are provided, and a temperature sensing device is located in the vicinity of the sintered metal for controlling the temperature of the apparatus. The advantages of such a controllable heating and/or cooling arrangement are believed to be clear from the preceding remarks.

According to a further feature of the invention, the disc filters are joined together in the form of a filter column, which is firmly connected only at one end thereof to the wall of the vessel. Thermal stresses between the filter column and the vessel are thereby largely avoided.

According to an added feature of the invention, the means for supplying gas bearing liquid metal to the outer chamber comprises an inlet to the vessel, and baffle means are provided for protecting the filter surfaces adjacent the inlet. The baffle thus prevents direct exposure of the filter surfaces to the supplied gas bearing the liquid metal and accordingly prevents momentary local temperature changes. It is advisable to brace this baffle at several points along the periphery thereof against the vessel wall in order to support the weight of the filter column.

Other features which are considered as characteristic for the invention are set forth in the appended claims.

Although the invention is illustrated and described herein as method and apparatus for continuously precipitating liquid metal from gases, it is nevertheless not intended to be limited to the details shown, since various modifications may be made therein without departing from the spirit of the invention and within the the scope and range of equivalents of the claims.

The invention, however, together with additional objects and advantages thereof will be best understood from the following description when read in connection with the accompanying drawing, in which:

FIG. 2 is a fragmentary longitudinal sectional view of FIG. 1;

FIG. 3 is a cross-sectional view of FIG. 2 taken along the line III — III in the direction of the arrows;

FIG. 4 is a cross-sectional view of FIG. 2 taken along the line IV — IV in the direction of the arrows;

FIG. 5 is a top plan view of FIG. 2 as seen in direction of the arrow C; and

Figure 1:
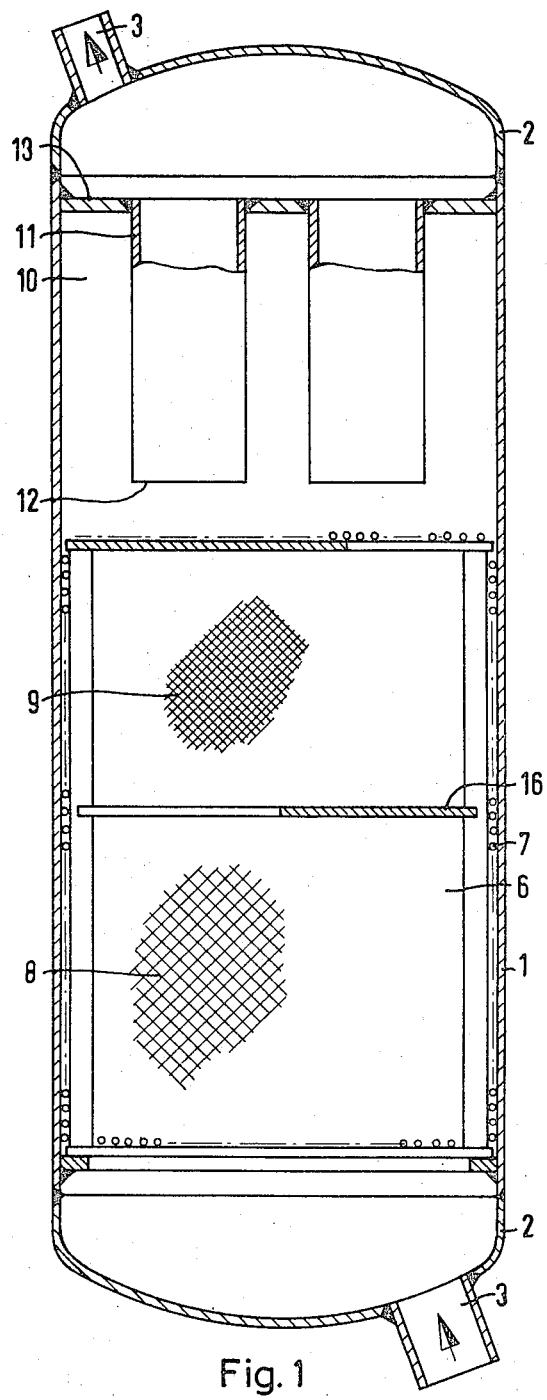
FIG. 1 is a diagrammatic longitudinal sectional view of one embodiment of the apparatus for continuously precipitating liquid metal from gas bearing the liquid metal in accordance with the invention of this application.

Referring now to the drawing, and first particularly to FIG. 1 thereof, there is shown therein a cylindrical vessel 1 which is closed, for example by welding, at the top and bottom thereof with a round cover 2, respectively, each of which is provided with a connecting duct 3. After assembly, this vessel is tightly welded, as aforementioned. It has been found to be more economical to avoid the use of flanges and bolts but rather to open the vessel by machine-cutting means, should such a step become necessary. In the lower half, substantially, of the vessel 1 there is provided an insert cage 6 formed of wire mesh 7 which, in approximately the lowermost third 8 of the vessel 1 is filled with so-called Pall rings (having a size 15 × 20 mm) and, in the middle third 9 of the vessel 1, with fine steel wool (having a diameter of 0.2 to 0.3 mm). In the uppermost third 10 of the vessel 1 several parallel, cylindrical sintered-metal cartridges 11 (having a pore size of 50 $\mu$) are located. The cartridges 11 are closed at their lower end by sintered metal plates 12, and their upper, open end are tightly inserted in a bulkhead 13.

In FIG. 2 there is shown the insert cage 6 of wire mesh 7, which is reinforced by bolts or pins 14 and metal straps 15.

In the cross-sectional view of FIG. 3 it can be seen that the insert cage 6 is closed by wire mesh at its bottom end, as viewed in FIG. 2.

FIG. 4 shows a cross section through the insert cage 6 of FIG. 2 from which it is apparent that the partition 16 is formed about one-half of sheet metal and about the other half of wire mesh.

FIG. 5 shows the insert cage 6 as viewed in direction of the arrow C in FIG. 2. Approximately two-thirds of the upper limit or surface of the insert cage 6 is closed off by a sheet metal plate and thereby, together with the sheet metal plate 16, causes a deflection in the flow of the gas that is being purified.

Figure 6:
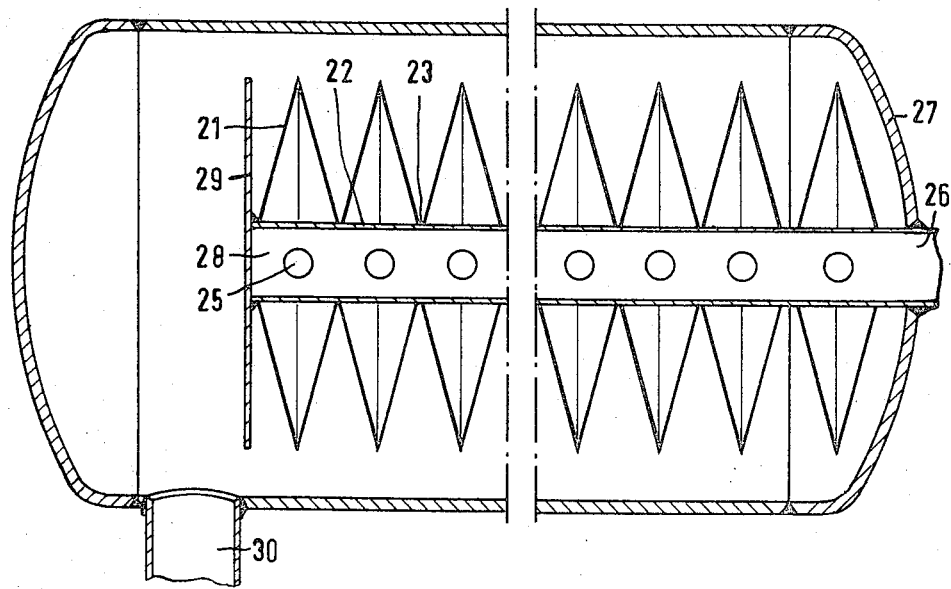
FIG. 6 is a diagrammatic longitudinal sectional view of another embodiment of the apparatus of the invention.

FIG. 6 shows another embodiment of the apparatus of the invention. Several disc filters 21, in the embodiment of FIG. 6, are tightly connected to one another, respectively, alternately at the outer and inner peripheries thereof. The disc filters 21, in the illustrated embodiment of FIG. 6, are mounted on a tube 22 which is formed with several holes 25 and is secured at an open end 26 thereof in an end wall of a vessel 27 and serves for discharging purified gas from the space defined by the secured disc filters 21, while a baffle plate 29 is attached at the other end 28 of the tube which is closed thereat. An inlet 30 supplies gas bearing liquid metal to the space defined by the secured disc filter 21 and the wall of the vessel 27 and serves simultaneously for discharging precipitated liquid metal therefrom. For larger quantities of liquid metal it is advisable to dispose the vessel 27 so that it is slightly inclined, and to provide a non-illustrated further drain for the liquid metal at the end of the vessel 27 opposite the gas entrance 30.

We claim:

1. Method of continuously precipitating liquid metal from gas in which the liquid metal is finely distributed which comprises the steps of heating the gas bearing the liquid metal to a temperature above the saturation temperature thereof, and then cooling the gas bearing the liquid metal to a temperature still exceeding the solidification temperature of the liquid metal.

2. Method according to claim 1 wherein at least one of the steps of the method is conducted in a filter with high thermal conductivity.

3. Method according to claim 1 wherein at least one of the steps of the method is conducted in a filter having pores whose size decreases in direction of flow of the gas bearing the liquid metal.

4. Method according to claim 1 which includes mixing cold gas with the gas bearing the liquid metal for cooling the latter gas.

5. Apparatus for carrying out the method of continuously precipitating liquid metal from gas in which the liquid metal is finely distributed according to claim 1 comprising an elongated substantially vertical container structure traversible from bottom to top therefrom by a flow of the gas bearing the liquid metal; means located in substantially the lower half of said container structure for heating the gas bearing the liquid metal flowing therethrough; metallic packing material located in the lowermost third of said container structure; a supply of steel wool located in the middle third of said container structure; and at least one substantially vertical, elongated sintered metal filter in the uppermost third of said container structure, said filter having a closed lower end and an open upper end, said upper end being secured in a tight bulkhead extending transversely within said container structure.

6. Apparatus according to claim 5 including means for varying the temperature of the gas bearing the liquid metal.

7. Apparatus according to claim 5 including a temperature sensor located in vicinity of said sintered metal filter for controlling the temperature in the apparatus.

8. Apparatus for carrying out the method of continuously precipitating liquid metal from gas in which the liquid metal is finely distributed, according to claim 1 comprising a vessel, having an outer wall, a plurality of disc filters mounted in said vessel and formed ofporous sintered metal, said disc filters being tightly connected to one another alternatingly at respective outer and inner peripheries thereof so as to form an inner chamber defined by said tightly connected disc filters and an outer chamber defined by said disc filters and said outer wall of said vessel, means connected to said outer chamber for supplying the gas bearing liquid metal to said outer chamber, and outlet means connected to said inner chamber for discharging therefrom gas filtered through said disc filters into said inner chamber from said outer chamber.

9. Apparatus according to claim 8 wherein said disc filters are joined together in form of a filter column, said filter column being firmly secured at only one end thereof to said outer wall of said vessel.

10. Apparatus according to claim 8 wherein said means for supplying gas bearing liquid metal to said outer chamber comprises an inlet to said vessel, and including baffle means located in said vessel for protecting surfaces of said disc filters located adjacent said inlet.

11. Apparatus according to claim 8 including means for varying the temperature of the gas bearing the liquid metal.

12. Apparatus according to claim 8 including a temperature sensor located in vicinity of the sintered metal disc filters for controlling the temperature in the apparatus.

* * * * *